E. E. MARLIN.
CLUTCH.
APPLICATION FILED JUNE 1, 1916.
1,237,932.
Patented Aug. 21, 1917.
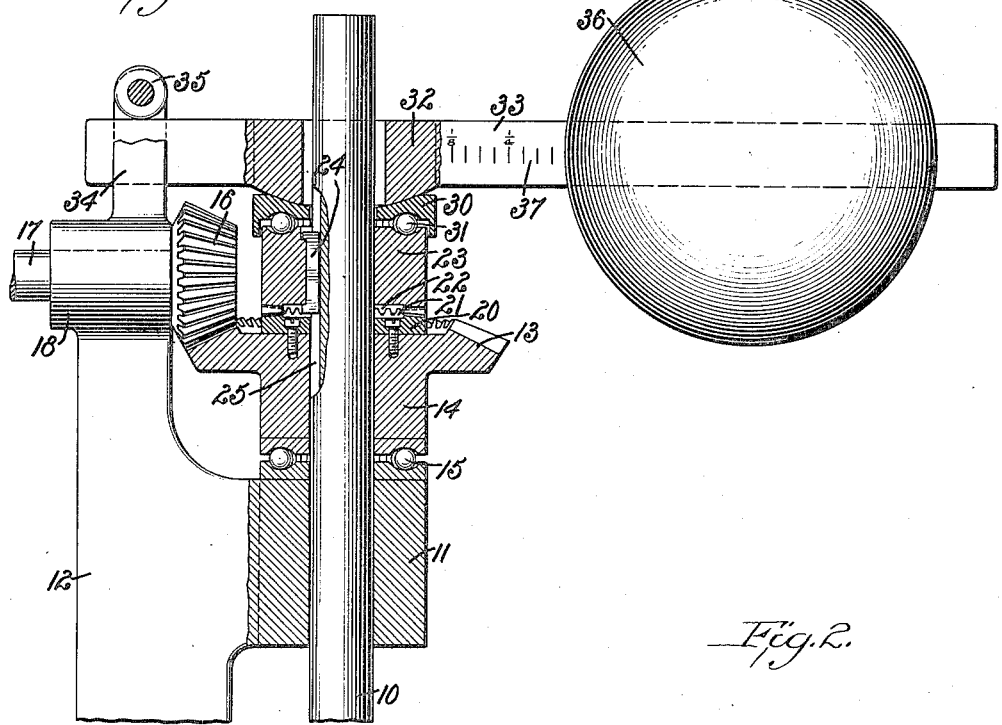
Fig. 1.
Fig. 2.
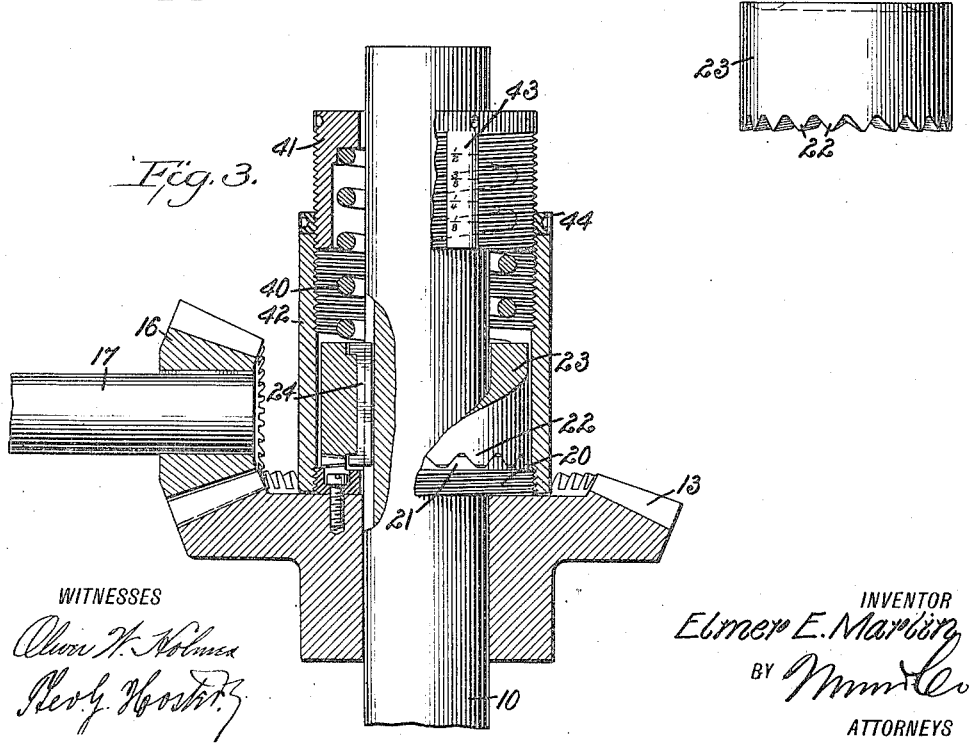
Fig. 3.
WITNESSES
INVENTOR
Elmer E. Marlin
BY
ATTORNEYS

UNITED STATES PATENT OFFICE.

ELMER E. MARLIN, OF DETROIT, MICHIGAN.

CLUTCH.

1,237,932.  Specification of Letters Patent.  Patented Aug. 21, 1917.

Application filed June 1, 1916. Serial No. 101,038.

*To all whom it may concern:*

Be it known that I, ELMER E. MARLIN, a citizen of the United States, and a resident of Detroit, in the county of Wayne and State of Michigan, have invented a new and Improved Clutch, of which the following is a full, clear, and exact description.

The object of the invention is to provide a new and improved clutch more especially designed for use on drill presses, line shaft pulleys, automatic machines and other machines and devices, and arranged to prevent overloading of the machine and consequent breaking of the drill or other tool used in the machine. Another object is to allow of conveniently adjusting and setting the clutch to any desired load.

In order to accomplish the desired result, use is made of a fixed clutch member on a driving part, a movable clutch member mounted to turn with and to slide on a part to be driven, the said clutch members having undulating or V-shaped teeth in mesh with each other, and an adjustable pressure means adapted to be set for a given load and bearing on the said movable clutch member to normally hold the teeth thereof in mesh with the teeth of the fixed clutch member and to allow the teeth of the fixed clutch member to glide over the teeth of the movable clutch member on an increase in the load.

A practical embodiment of the invention is represented in the accompanying drawings forming a part of this specification, in which similar characters of reference indicate corresponding parts in all the views.

Figure 1 is a sectional side elevation of the clutch;

Fig. 2 is a side elevation of the movable clutch member; and

Fig. 3 is a sectional side elevation of a modified form of the clutch.

The clutch as illustrated in the drawings is shown applied to a drill press having the usual drill press spindle 10 carrying a drilling tool (not shown) and mounted to turn and to slide up and down in suitable bearings 11, of which one is shown as part of the main frame 12 of the drill press. On the drill press spindle 10 is mounted to turn loosely a bevel gear wheel 13 having its hub 14 mounted to turn on a ball bearing 15 mounted on top of the bearing 11. The bevel gear wheel 13 is in mesh with a bevel pinion 16 secured on a driven shaft 17 journaled in suitable bearings 18, of which one is illustrated, and arranged on the frame 12. On the top of the bevel gear wheel 13 is secured a clutch member 20 provided with undulating or V-shaped clutch teeth 21 normally in mesh with correspondingly shaped clutch teeth 22 formed on the lower end of a movable clutch member 23 provided with a key 24 engaging the usual keyway 25 in the drill press spindle 10. By the arrangement described the clutch member turns with the spindle 10 and is free to slide up and down on the same. The clutch members 20 and 23 are preferably made of hardened steel and when the drill press is in use and the shaft 17 is running then a rotary motion is transmitted by the pinion 16, the bevel gear wheel 13 and the meshing clutch members 20 and 23 to the drill press spindle 10.

A presser plate or disk 30 rests on a ball bearing 31 arranged on the top of the clutch member 23, and this presser plate 30 is concaved at the top and engaged by a correspondingly shaped boss 32 formed or attached to the under side of a weighted lever 33. The weighted lever 33 extends with its fulcrum end between lugs 34 extending from the top of the bearing 18, and the top of this end of the lever 33 bears against the under side of a friction roller 35 journaled on the lugs 34. On the free end of the lever 33 is adjustably mounted a weight 36 and the said lever is provided with a graduation 37 for setting the weight 36 by, to cause the lever 33 to bear with more or less force on the presser plate 30, and, consequently, on the movable clutch member 23. The weight 36 is set to the load to be carried by the drill press spindle 10, and in case the drilling tool sticks in the work or the resistance of the spindle 10 is increased for any other reason beyond the load at which the weight 36 is set at the time, then the clutch member 23 is caused to slide upward on the spindle 10 by the cam action between the inclined faces of the clutch teeth 21 and 22, thus preventing further rotation of the spindle 10 and consequent breaking of the drill tool attached to the spindle.

It is understood that the shaft 17 and, consequently, the bevel pinion 16, bevel gear wheel 13 and its clutch member 20 rotate with the usual power and speed, and when the spindle 10 offers a greater resistance than that to which the lever 36 is set then the clutch member 23 moves out of engagement with the clutch member 20, that is, the weighted lever 33 is swung upward. When the obstruction is removed, the weighted lever 33 returns the clutch member 23 and holds the same in mesh with the clutch member 20 to again drive the spindle 10.

In the modified form shown in Fig. 3, the top of the clutch member 23 is engaged by the lower end of a spring 40 coiled around the spindle 10 and resting with its upper end on a cap 41 screwing in a casing 42 screwed or otherwise secured at its lower end on the clutch member 20 attached to the bevel gear wheel 13 so as to rotate with the same. By screwing the cap 41 down or up in the casing 42 the tension of the spring can be regulated so as to set the clutch to a predetermined load. The cap 41 is provided with a graduation 43, any mark of which indicates the load at the top of the casing 42. A lock or jam nut 44 screws on the cap 41 against the top of the casing 42 to hold the cap 41 locked in the adjusted position. It is understood that when it is desired to set the spring 40 for a heavier load, it is necessary to first unscrew the lock nut 44 to allow of screwing the cap 41 downward in the casing 42, and when the spring has been set then the lock nut 44 is again screwed down against the top of the casing. In case the load is increased for any reason whatever, then the clutch member 23 moves out of mesh with the clutch member 20 and against the tension of the spring 40 so that the rotation of the spindle 10 ceases until normal conditions prevail.

Having thus described my invention, I claim as new and desire to secure by Letters Patent:

1. In a clutch, the combination of a fixed clutch member on a driving part, a movable clutch member mounted to turn with and to slide on a part to be driven, the said clutch members having V-shaped teeth in mesh with each other, a spring pressing with one end on the said movable clutch member, a casing attached to the said fixed clutch member and inclosing the said clutch members and the said spring, and a cap screwing in the end of the casing against the other end of the said spring.

2. In a clutch, a spindle, a driven gear wheel loosely mounted on the spindle, a clutch member secured to the gear wheel and provided with teeth, a second clutch member mounted to slide on and turn with the spindle, a casing secured to the first named clutch member and projecting above the sliding clutch member, a hollow cap screwing into the upper end of the casing, and a spring coiled around the spindle in the casing and cap and having one end engaging the said cap and the other end the sliding clutch member.

3. In a clutch, a spindle, a driven gear wheel loosely mounted on the spindle and provided with a toothed clutch member, a second toothed clutch member mounted to slide on and turn with the spindle, a casing rotating with the said gear wheel and projecting above the sliding clutch member, a cap screwing into the upper end of the casing and provided with graduations, a jam nut screwing on the cap against the upper end of the casing, and a spring coiled on the spindle and between the cap and sliding clutch member.

ELMER E. MARLIN.